United States Patent [19]

Okazaki et al.

[11] 4,446,274

[45] May 1, 1984

[54] VINYL ACETATE-ETHYLENE COPOLYMER EMULSION AND AQUEOUS EMULSION ADHESIVE COMPOSITION CONTAINING THE EMULSION

[75] Inventors: Haruo Okazaki, Ichihara; Takashi Ohkubo, Chiba, both of Japan

[73] Assignee: Denki Kagaku Kogyo Kabushiki Kaisha, Tokyo, Japan

[21] Appl. No.: 467,057

[22] Filed: Feb. 16, 1983

Related U.S. Application Data

[63] Continuation of Ser. No. 277,451, Jun. 25, 1981, abandoned.

[51] Int. Cl.³ .............................................. C08L 33/00
[52] U.S. Cl. .................................... 524/812; 526/272; 526/304
[58] Field of Search ................. 524/812; 526/272, 304

[56] References Cited

U.S. PATENT DOCUMENTS

| | | | |
|---|---|---|---|
| 3,503,918 | 3/1970 | Le Sota et al. | 524/501 |
| 4,044,197 | 8/1977 | Wiest et al. | 526/304 |
| 4,129,545 | 12/1978 | Sunamori et al. | 524/812 |
| 4,219,454 | 8/1980 | Iacoviello et al. | 524/812 |

*Primary Examiner*—Joseph L. Schofer
*Assistant Examiner*—N. Sarofim
*Attorney, Agent, or Firm*—Jordan and Hamburg

[57] ABSTRACT

An emulsion of a quarterly vinyl acetate-ethylene copolymer emulsified in an aqueous medium, is provided. The quarterly copolymer comprises: 100 parts, by weight, of a vinyl acetate-ethylene copolymer prepared from 95 to 60 parts, by weight, of vinyl acetate monomer (I) and 5 to 40 parts, by weight, of ethylene monomer (II); 0.5 to 7 parts, by weight, of an acid monomer (III) selected from the group consisting of monobasic unsaturated carboxylic acids each having 3 to 17 carbon atoms, dibasic unsaturated carboxylic acids each having 3 to 17 carbon atoms, anhydrides of said dibasic unsaturated carboxylic acids and semi-esters of said dibasic unsaturated carboxylic acids each having an alkyl chain of the alcohol part having 1 to 10 carbon atoms, and mixture thereof; and 0.5 to 15 parts, by weight, of an acrylamide compound (IV) represented by the general formula of: $CH_2=CHCONHCH_2OR$; wherein R is an alkyl group having 1 to 10 carbon atoms. An aqueous emulsion adhesive is also provided which comprises the quarterly copolymer.

7 Claims, No Drawings

VINYL ACETATE-ETHYLENE COPOLYMER EMULSION AND AQUEOUS EMULSION ADHESIVE COMPOSITION CONTAINING THE EMULSION

This is a continuation of application Ser. No. 277,451, filed June 25, 1981, now abandoned.

BACKGROUND OF THE INVENTION

1. Field of the Invention

The present invention relates to an emulsion of a vinyl acetate-ethylene copolymer and an aqueous emulsion adhesive composition containing said emulsion.

2. Prior Art

It has hitherto been known that emulsions of vinyl acetate-ethylene copolymers have good adhesive properties of a wide variety of materials including not only those having good affinity with aqueous emulsion adhesives, such as wood, paper, fibers and aluminium, but also hydrophobic resins, such as polyvinylchloride resins and polystyrene resins. However, the known emulsions of vinyl acetate-ethylene copolymers having high vinyl acetate content cannot be used for binding films made of materials which are more hydrophobic and poorer in surface activities, such as ABS resins, polyester resins, two-directionally elongated polyamide resins and polyolefin resins, since they are deficient in adhesive properties thereto. The known emulsions of this type have further disadvantages that they are inferior in resistances against heat, water-proof properties and solvent-proof properties.

In order to eliminate the aforementioned disadvantages of the emulsions of binary copolymers prepared from vinyl acetate and ethylene, it has been tried to use an emulsion of ternary copolymer which has been prepared by polymerizing vinyl acetate and ethylene monomers with a third monomer of unsaturated carboxylic acid or ester thereof. However, the addition of an acid monomer is accompanied with disadvantageous phenomenon of separation of homopolymer of the added acid monomer or copolymer mainly composed of the added acid monomer in the water phase in a large quantity, leading to disrupture of emulsion or formation of coarser particles.

On the other hand, it has been proposed to prepare a thermosetting composition containing said emulsion of vinyl acetate ethylene copolymer as the main ingredient added with an initial stage condensation product of an amine resin, such as melamine-formaldehyde resin or urea-formaldehyde resin, and a hardener catalyst for the amino resin so as to improve the water-proof property and the solvent-proof property of the composition and to obtain a composition suited for use as an adhesive for electrostatic flock transfer sheet. However, such an adhesive has disadvantages that a pollution problem at the working site and a problem of residual poison are caused by formalin. Even if formalin is not used in the preparation of adhesive of this type, the known thermosetting adhesive compositions have disadvantages that they require high temperature for setting and that they cannot be used for certain kinds of materials.

An aqueous emulsion type adhesive containing a synthetic resin is used for binding the laminate layers to manufacture a composite laminated film or plate when the laminate layers are made of materials easily to be adhered with each other, for example made of paper and a metal foil or paper and a plywood. However, in general, the aqueous emulsion type adhesives are unsatisfactory in their adhesive powers when used for binding the films having hydrophobic surfaces, such as printing sheets and plastics films made of polyethylene, polypropylene, polyesters, polyvinylchloride and polystyrene, particularly two-directionally elongated polystyrene. In addition, they do not form dried membrane which are satisfactory in transparency, luster and water-proof property capable of withstanding boiling for sterilization. For this reason, adhesives containing organic solvents are commonly used for binding the hydrophobic materials of the aforementioned kind. However, in recent years, the use of organic solvents has not been favorably accepted by the public accompanying with the increasing social interest on the elimination of air pollution, bad odor and industrial pollution problems or the increasing demand for improving environmental sanitation at the working sites. Particularly, in the field of packaging or wrapping food stuffs, adverse effects of residual organic solvents on the flavor or taste of the foods or poisons caused thereby attract social concern, and development of an adhesive containing no poisonous organic solvent is earnestly desired.

The technique of modifying the emulsions of polyvinyl acetate by the addition of an epoxy resin and a hardener for epoxy resin has been made known in the art, for example by British Patent Specification No. 949,460 which discloses a method of modifying an emulsion of vinyl polymer by mixing an epoxy resin and a hardener for epoxy resin and by the specification of German Democratic Republic Patent No. 82518 which discloses a method of the preparation of an adhesive or paint composed, in combination, of a homo-emulsion of a polyvinyl acetate, an epoxy resin and an amine hardener. However, the known aqueous emulsion compositions disclosed in the preceding patent specifications do not exhibit satisfactory adhesive properties when used to bind hydrophobic plastic films made of, for example, polyethylene, polypropylene, polyesters, hard polyvinylchloride, two-directionally elongated polystyrene and two-directionally or unidirectionally elongated polyamide resins. Particularly when used for making a dry laminate from polyolefin films, the known modified emulsion type adhesives do not exert sufficient adhesive powers onto the polyolefin films which are poor in surface activities, and might rather impair the transparency, water-proof property or rigidity (or stiffness) which are important for improving commercial value or necessary in the package materials. Similar evaluations could be given to the known adhesives mainly composed of an emulsion of a vinyl acetate-ethylene copolymer, which has been considered as the most suitable main adhesive component, containing a high content of vinyl acetate groups and added with an epoxy resin and a hardener for epoxy resin as mentioned above. When an emulsion of a vinyl polymer is used as the main component and added with a modifier to prepare an adhesive composition, the main component per se must have strong adhesive power to plastic films. An adhesive somewhat improved in adhesive property to plastic films can be prepared when polyvinyl alcohol is used to form a protective colloid in the preparation of an adhesive mainly composed of an emulsion of a vinyl acetate ethylene copolymer. However, the resultant emulsion of vinyl acetate-ethylene copolymer has disadvantages that it forms a dried membrane which is poor in transparency, that the membrane becomes white when subjected to boiling for sterilization and that the adhesive power thereof is not yet satisfactory. Moreover, the binary emulsion of vinyl acetate-ethylene prepared from vinyl acetate monomers and ethylene monomers has another disadvantage that it lacks functional groups necessary for binding with the functional groups of an added modifier, such as epoxy resin, to form a three-dimensional network, resulting in formation of a laminated film which is deficient in stiffness necessary for use as a package material, so that such a laminated film might encounter difficulties at the step of filling goods therein, or suffers from blistering at the heat-seal step imparing the appearance thereof as a package material.

OBJECTS AND SUMMARY OF THE INVENTION

An object of this invention is to provide an emulsion of a vinyl acetate-ethylene copolymer excellent in adhesive property, particularly excellent in adhesive property when used for binding hydrophobic materials, and to provide an aqueous emulsion adhesive containing said emulsion.

Another object of this invention is to provide an emulsion of a vinyl acetate-ethylene copolymer excellent in heat-resistant, water-proof and solvent-proof properties, and to provide an aqueous emulsion adhesive containing said emulsion.

A further object of this invention is to provide an emulsion of a vinyl acetate-ethylene copolymer which is stably polymerized without disruption of the emulsion and without forming coarser particles, and to provide an aqueous emulsion adhesive containing said emulsion.

A still further object of this invention is to provide a thermo-setting aqueous emulsion adhesive which can be thermally set at a relatively low temperature in the absence of a hardening catalyst or hardener and which is excellent in storage stability.

Yet a further object of this invention is to provide an aqueous emulsion adhesive particularly suited for use in making a laminated composite film which is excellent in transparency and luster, without becoming white even when subjected to boiling for sterilization or blistering at the heat-seal step and having sufficient rigidity or stiffness necessary for use as the package material.

The above and other objects and advantages of this invention will become apparent from the following description.

According to this invention, there is provided an emulsion of a quarterly vinyl acetate-ethylene copolymer emusified in an aqueous medium, said quarterly copolymer comprising:

100 parts, by weight, of a vinyl acetate-ethylene copolymer prepared from 95 to 60 parts, by weight, of vinyl acetate monomer (1) and 5 to 40 parts, by weight, of ethylene monomer (II);

0.5 to 7 parts, by weight, of an acid monomer (III) selected from the group consisting of monobasic unsaturated carboxylic acids each having 3 to 17 carbon atoms, dibasic unsaturated carboxylic acids each having 3 to 17 carbon atoms, anhydrides of said dibasic unsaturated carboxylic acids and semi-esters of said dibasic unsaturated carboxylic acids each having an alkyl chain of the alcohol part having 1 to 10 carbon atoms, and mixtures thereof; and 0.5 to 15 parts, by weight, of an acrylamide compound (IV) represented by the general formula of:

$CH_2=CHCONHCH_2OR$;

wherein R is an alkyl group having 1 to 10 carbon atoms.

DESCRIPTION OF THE INVENTION the present invention will now be described in detail hereinbelow.

The ratio of vinyl acetate to ethylene contained in 100 parts, by weight, of the vinyl acetate-ethylene copolymer according to this invention is in the range of 60 to 95 parts: 40 to 5 parts, by weight. This relatively high content of vinyl acetate is preferred for improving the adhesive property. However, if the content of vinyl acetate exceeds the range set forth above, the chemical affinity or compatibility the adhesive with hydrophobic resins becomes poor, leading to reduction in adhesive power. On the contrary, if the content of vinyl acetate is less than the range set forth above, the stability of emulsion is deteriorated to lower the cohesive power of the membrane to an extent that the emulsion is not suited for use as an adhesive. Also, the emulsion of the vinyl acetate-ethylene copolymer according to this invention is prepared generally by polymerizing vinyl acetate monomers and other monomers in an aqueous medium in the presence of pressurized ethylene monomers forming the vapor phase. Therefore, it is required to use a polymerization reactor which withstands a higher pressure, in order to prepare an emulsion having a lower vinyl acetate content, i.e. a higher ethylene content. Installation of a higher pressure reactor requires a vast investment and is not desirous from an economical point of view.

The third monomer to be copolymerized with vinyl acetate and ethylene monomer, i.e. the acid monomer (III) as recited in the appended claims, is one or a mixture of monobasic and dibasic unsaturated carboxylic acids each having 3 to 17 carbon atoms, anhydrides of said dibasic unsaturated carboxylic acids and semi-esters each including an alkyl chain of the alcohol part having 1 to 10 carbon atoms. Examples of such unsaturated carboxylic acids are acrylic acid, methacrylic acid, itaconic acid, maleic acid, fumaric acid, citraconic acid, aconitic acid and crotonic acid. The total quantity of one or more acid monomers contained in the monomer mixture for preparing the emulsion of the vinyl acetate ethylene copolymer of this invention should be 0.5 to 7 parts, by weight, relative to 100 parts, by weight, of the total quantity of vinyl acetate and ethylene in the monomer mixture. (In the following description, "part" and "%" stand for "part by weight" and "% by weight" unless otherwise specified.) If the quantity of acid monomer is less than 0.5 parts, the functional group density is too low so that the resultant copolymer is in shortage of adhesive property and cross-linking index. If the quantity of acid monomer exceeds 7 parts, the excess acid monomers tend to dissolve in water to form coarser particles at the initial stage of polymerization.

The fourth monomer contained in the monomer mixture for preparing the emulsion of this invention, i.e. the acrylamide compound (IV) as recited in the appended claims, are those represented by the general formula of $CH_2=CHCONHCH_2OR$, wherein R is an alkyl group having 1 to 10 carbon atoms, preferably 1 to 4 carbon atoms. Examples of preferred compounds are N-methoxymethylacrylamide, N-ethoxymethylacrylamide, N-n-propoxymethylacrylamide, N-n-butoxymethylacrylamide, N-iso-butoxymethylacrylamide and N-methylolacrylamide-2-ethylhexyl ether. Any one or more of the aforementioned compounds may be used singly or in combination.

These acrylamide compounds serve to introduce the functional groups and cross-linking points in the vinyl acetate-ethylene copolymer contained in the emulsion of this invention thereby to improve the adhesive property and the property of the dried membrane of adhesive, and also serve to suppress the formation of coarse particles due to separate polymerization of individual monomers. The content of the acrylamide compound in the monomer mixture for preparing the emulsion of the vinyl acetate-ethylene copolymer of this invention should be 0.5 to 15 parts relative to 100 parts of the total quantity of vinyl acetate and ethylene monomers. If the content thereof is less than 0.5 parts, the aforementioned advantageous effects, particularly the effect of suppressing coarser particles originated from the acid monomer, are limited. No further improvement in advantageous merit is appreciated if the acrylamide compound is added in a quantity of more than 15 parts, hence increasing the added amount of the acrylamide compound is not recommended from an economical point of view.

The emulsion of the vinyl acetate-ethylene copolymer according to this invention is prepared from a monomer mixture containing the aforementioned four kinds of monomers in the ratio as defined above through a normal emulsion polymerization process. In detail, monomers other than the ethylene monomer are dispersed in water added with one or a few emulsifiers and a buffer agent to obtain an emulsion which is charged into a reactor under agitation. Then, ethylene is pressed in the reactor to form the pressurized vapor phase in the reactor, and the monomers are subjected to emulsion polymerization in the presence of a polymerization catalyst.

The emulsion of the quarterly vinyl acetate-ethylene copolymer according to this invention may be prepared by polymerizing all of the component monomers at one time. However, the quarterly vinyl acetate-ethylene copolymer emulsion may be obtained by a two-step process comprising the first step of polymerizing 20 to 80% of vinyl acetate monomer under the atmosphere of ethylene until the degree of polymerized monomers reaches 5 to 50% of the total monomers, and the second step of adding a mixture containing the remaining portion of vinyl acetate monomer, an acid monomer (III) and an acrylamide compound (IV) followed by completion of polymerization under the atmosphere of ethylene. It is a surprising finding that the emulsion obtained by the two-step process is remarkably improved in adhesive property and degree of cross-linking.

More in detail, the copolymer prepared by the two-step process gives an adhesive which is remarkably improved in adhesive power to an extremely hydrophobic resin and additionally improved in water-proof, heat-resistant and solvent-proof properties since the acid monomer and the acrylamide groups in the resultant copolymer are uniformly distributed so that the functional groups derived therefrom act efficiently to the hydrophobic resin. This advantageous effect is considered to be attributed to the following reason. In the two-step polymerization process, the acid monomer is not present at the initial polymerization step and added after the polymerization system after the copolymer of ethylene and vinyl acetate is formed at the interfaces of micelles, so that the formation of homo-polymer of acid monomer or copolymers mainly composed of the acid monomer is obviated and, as a result, the acid monomers are dispersed or distributed randomly into the emulsion particles. The functional groups originated from the thus distributed acid monomers facilitate effective adhesion onto a hydrophobic resin and also serve to form effective cross-linking points.

The present invention is characterized by the use of an acrylamide compound represented by the general formula of $CH_2=CHCONHCH_2OR$ together with an acid monomer, whereby the polymerization stability of the emulsion of the vinyl acetate-ethylene copolymer is improved. The mechanism of stabilization by the acrylamide compound is not scientifically proved, but may be presumed as follows. Although the acrylamide compound is scarcely soluble in water, it has extremely intimate miscibility with vinyl acetate, ethylene and an acid monomer so that it prevents the acid monomer, the third monomer component, from being dissolved in water and simultaneously serves as a promotor to dissolve the acid monomer uniformly in the ethylene-vinyl acetate system. As a result, polymerization of the acid monomer in the water phase, which causes disturbance of the polymerization stability, is prevented and the acid monomer is effectively embraced in the resultant copolymer.

If the fraction of vinyl acetate treated through the first step of the two-step process is less than 20% of the total quantity of vinyl acetate, the two-step process is not appreciably differentiated from the one-step polymerization where all of vinyl acetate is polymerized collectively with the acid monomer to lower uniform dispersibility of the acid monomer into the emulsion particles. On the contrary, if the fraction of vinyl acetate treated through the first step exceeds 80%, the content of vinyl acetate monomer contained in the polymerization mixture at the second step becomes too low and the relative content of the acid monomer in the polymerization mixture at the second step is excessively increased to lower uniform dispersibility thereof.

If the degree of polymerized monomers processed through the first step does not reach 5% of the total monomers, polymer micelles are not grown to the level enough for protecting the acid monomers. On the contrary, if the degree of polymerization after processed through the first step exceeds 50% of the total monomers, the acid monomers and the acrylamide monomers are not uniformly distributed into the emulsion particles made of ethylene/vinyl acetate copolymer, resulting in formation of quarterly copolymer which is unsatisfactory in adhesive property.

At the second step, the monomer mixture may be added to the reaction mixture of the first step substantially collectively at one time. However, it is preferred to add the monomer mixture continuously or intermittently, for example over a period of 30 minutes to 420 minutes, in order to distribute the acid monomers and the acrylamide monomers uniformly into the copolymer molecules.

In order to prepare an emulsion of vinyl acetate-ethylene copolymer containing ethylene in the content as defined above, the pressure of ethylene should be pertinently maintained at a pressure of from 3 to 100 atm., and additional ethylene should be supplied to the polymerization system, if necessary, as the pressure in the reactor is dropped with the proceeding of polymerization.

The polymerization temperature is varied depending on the used catalyst, and ranges generally lower than 100° C., and preferably 40° to 70° C.

A variety of free radical forming catalysts generally used in the known emulsion polymerization processes can be used as the catalyst for polymerization in the present invention without any particular limitation. Examples of usable catalysts include organic and inorganic peroxides such as lauryl peroxide, tert-butyl hydroxyperoxide, ammonium persulfate, potassium persulfate, sodium persulfate and perboric acid. Further, these peroxides may be used together with a reducing agent, such as bisulfites, sulfoxylates and ferrous salts, to from redox systems. The added quantity of a catalyst ranges, in general, 0.1 to 2% of the quantity of vinyl acetate, and the redox system catalyst may be pertinently used in the quantity of 25 to 100% of the aforementioned range.

Preferable emulsifiers are ordinary anionic surface active agents including sulfuric esters of higher alcohols such as lauryl alcohol, alkylbenzenesulfonates such as sodium dodecylbenzenesulfonate, and alkylnaphthalenesulfonates. Nonionic surface active agents, such as polyoxyethylene alkylphenyl ether, polyoxyethylenesorbitan fatty acid esters and oxyethylene-oxypropylene block copolymers, may be used singly or in combination. A polymer protection colloid, such as polyvinyl alcohol, methylcellulose and hydroxyethyl cellulose, may also be used together with or in place of the emulsifier.

With the aim to providing the emulsion of the quarterly vinyl acetate-ethylene copolymer according to this invention with a good membrane forming property, a plasticizer or a promotor for forming membrane may be added to the emulsified polymerization mixture for forming the vinyl acetate-ethylene copolymer. Preferable agents for this purpose include phthalic acid esters, such as dibutyl phthalate and dioctyl phthalate; glycols, such as ethylene glycol, propylene glycol and polyethylene glycol; glycol monoethers, and esters thereof, such as methyl cellosolve and butyl cellosolve; carbitol esters, such as butylcarbitol acetate; and benzyl alcohol.

The emulsion of the quarterly vinyl acetate-ethylene copolymer of the invention is obtained in the form of an aqueous emulsion containing about 40 to 70% of solid content by copolymerizing the aforementioned monomers, and may be used as an adhesive for binding arbitrary combinations of paper, woods, and hydrophobic and hydrophilic resins. The characteristic feature of the emulsion of the invention resides in that it can bind the films made of hydrophobic resins, such as ABS resin, polyester resins, two-directionally elongated polyamide resins and polyolefin resins, and in that it forms a membrane excellent in water-proof, heat-resistant and solvent-proof properties.

According to a further aspect of the invention, modified or further improved adhesives based on the emulsion of the quarterly copolymer of vinyl acetate-ethylene system are provided, by adding a modifier selected from the group consisting of polyalkylenepolyamines, polyethyleneimines, polyaminepolyamides and mixtures thereof, or by adding an epoxy resin or by adding a nitrogen-containing resin selected from the group consisting of polyaminepolyamides, polyethyleneimines and mixtures thereof and an epoxy resin.

Firstly, the aqueous emulsion adhesive containing the emulsion of the quarterly vinyl acetate-ethylene copolymer of the invention and the modifier as mentioned above will be described in detail. By the addition of one or more of polyalkylenepolyamines, polyethyleneimines and polyaminepolyamides to the aforementioned emulsion of the quarterly vinyl acetate-ethylene copolymer, the adhesive property can be further improved to obtain an adhesive which can be applied on a wide variety of materials to be bound together. The polyalkylenepolyamines which may be used in the present invention are those represented by the general formula of $NH_2+(CH_2)_m NH+_n H$, wherein $m=2$ to 10 and $n=1$ to 10. Examples of such polyalkylenepolyamines include ethylenediamine, diethylenetriamine, triethylenetetramine, tetraethylenepentamine, pentaethylenehexamine and 3,3-imino-bis-propylamine, and mixtures thereof.

The polyethyleneimines which may be used in the present invention include linear and non-linear polyethylenes having active hydrogen atoms, which are generally present in the form of linear polymer due to highly active hydrogen atoms, bonded to nitrogen atoms and are represented by the formulae of:

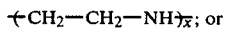; or

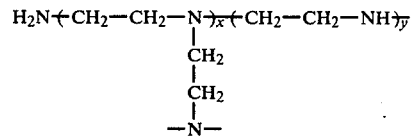

wherein x and y are integers.

The polyaminepolyamides which may be used in the present invention are polycondensation products of the aforementioned polyalkylenepolyamines with polymerized fatty acids, and have the amine values of from 20 to 900. The polymerized fatty acids may be obtained by polymerizing drying oils, non-drying oils, free fatty acids and polymerization products of lower alcohol esters of these fatty acids. The polymerized fatty acids may preferably be the polymerization products of the mixtures substantially obtained from oleic acid, linoleic acid and tall oil, since these fatty acids are easily available and are relatively readily polymerized. Another preferable example of the compounds of this kind is a dimer acid obtained by dimerizing an unsaturated fatty acid and represented by the following formula of:

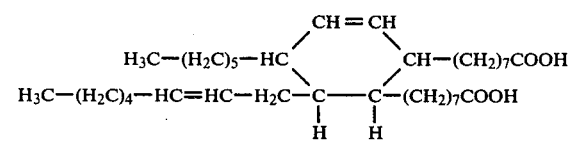

The polyaminepolyamides which may be used in the present invention include complexes of the aforementioned polyaminepolyamides blocked by any of monoglycidyl compounds, various isocyanates and $BF_3$.

A modifier selected from the compounds as aforementioned is mixed with the emulsion of the invention in a ratio of 0.5 to 20 parts to 100 parts based on solid contents of the quarterly vinyl acetate-ethylene copolymer. If the added quantity of the modifier is less than 0.5 parts, the effect of improving the adhesive property to a hydrophobic resin is limited to a lower level; whereas if the added quantity exceeds 20 parts, the dried adhesive membrane becomes too soft to withstand a practical use.

Although the mixing procedure for mixing the emulsion of the vinyl acetate-ethylene copolymer with the modifier is not limited, it is recommended firstly to charge the emulsion of the vinyl acetate-ethylene copolymer having a relatively low viscosity in the mixing vessel and then to add a modifier having, in general, a high viscosity followed by agitating at a high speed to emulsify and disperse the modifier. The modifier may be heated to about 40° to 60° C. in order to lower the viscosity thereof. However, the heating temperature should be limited not to rise higher than 60° C. in order to obviate disruption of the emulsion. It is a very effective measure to dissolve a modifier once in an organic solvent by adding 0.1 to 10 parts of the organic solvent to 1 part of the modifier, prior to mixing with the emulsion of the vinyl acetate-ethylene copolymer. The organic solvents used for this purpose include a variety of glycols such as ethylene glycol, propylene glycol, polyethylene glycol and polypropylene glycol; glycerin; and mixed solvents of mineral spirit with ester solvents such as ethylene glycol monoethyl acetate, ethylene glycol diacetate, diethylene glycol monoacetate, ethylene glycol monomethyl ether acetate, 2-ethylhexyl acetate, hexyl acetate and isobutyl isobutylate. A wetting agent for promoting dispersion of the modifier into the emulsion may also be used, and the examples of the wetting agent include commercially available non-ionic wetting agents made of modified alkylphenols, such as alkylphenoxypoly(ethyleneoxy)ethanol and the nonyl phenol-ethylene oxide condensates added with 9 to 10 mols of ethylene oxide.

The modified adhesive composition according to this invention, as described in detail hereinabove, is obtained in the form of an aqueous emulsion containing about 20 to 70% of solid contents by mixing the emulsion of the quarterly vinyl acetate-ethylene copolymer with a modifier, and may be used as an adhesive for binding arbitrary combinations of paper, woods, and hydrophobic and hydrophilic resins. When compared to the unmodified emulsion of the quarterly copolymer of the invention, the modified composition is further improved in adhesive property onto films of highly hydrophobic resins, such as ABS resin, polyester resins, two-directionally elongated polyamide resins and polyolefin resins, and also further improved in water-proof, heat-resistant and solvent-proof properties.

Now, the aqueous emulsion adhesive containing an epoxy resin admixed with the emulsion of quarterly vinyl acetate-ethylene copolymer of the invention will be described. The aqueous emulsion adhesives of this type have excellent adhesive properties and thermosetting properties and well adapted for thermosetting adhesives for use in the electrostatic flock transfer process. The adhesive compositions of this invention containing epoxy resins are conveniently used as the adhesives for flock transfer process, as has been described above, since they exert excellent bonding strengths when used to bind any of plastics materials, metals, woods and fabrics, and can be set or hardened by heating at a relatively low temperature of 100° to 130° C. without using any setting catalyst or hardener to form membranes excellent in water-proof and solvent-proof properties. It is a matter of course that the admixed epoxy resin takes part in the thermosetting reaction, but it has not been made clear why the setting reaction proceeds at a low temperature of 100° to 130° C. in the absence of a catalyst. However, it is reasonably presumed that the acid monomers (III) having carboxylic groups and the acrylamide compound (IV) having cross-linking functional groups contained in the emulsion of quarterly vinyl acetate-ethylene copolymer have some catalytic actions and concurrently serve as the media for cross-linking reaction. The adhesive composition of this invention does not contain any hardener or promotor for hardening catalyst, so that it has a long pot-life and no fear of gelatinization during the storage period. To summarize, it may be said that the emulsion type adhesive composition containing an epoxy resin according to this invention has remarkable advantages that it can be thermoset at a relatively low temperature and nevertheless is a one-liquid type adhesive, and that it is excellent in storage stability and adhesive property.

Preferable epoxy resins used in this invention include liquid epoxy resins or solid epoxy resins which may be emulsified by hot-melting, examples of such resins being condensation products of the compounds having sources for epoxy groups, such as epichlorohydrin, with the compounds having active hydrogen atoms, such as phenolic —OH groups, —COOH of carboxylic group and —NH$_2$ of amine group. It is preferred that the resins has an epoxy equivalent of about 100 to 7,000. Examples of preferable compounds having active hydrogen atoms include bisphenol series compounds such as bisphenol-A, novolak resin, polyfunctional phenols such as polyhydroxybenzene, aromatic dicarboxylic acids, hydroxycarboxylic acids and aromatic amino compounds. Also preferably used are epoxy group-containing vinyl compounds, such as glycidyl ester of acrylic or methacrylic acid, which may be used singly or in combination in the presence of a chain transfer agent.

Each of these epoxy resins may be added to the emulsion of the quarterly vinyl acetate-ethylene copolymer of the invention followed by dispersion, or may be added and dispersed in the polymerization system for the quarterly vinyl acetate-ethylene copolymer prior to polymerization. In either case, 5 to 60 parts of the epoxy resin is mixed with 100 parts (solid base) of the quarterly vinyl acetate-ethylene copolymer. If the quantity of the added epoxy resin is less than 5 parts, the resultant resin mixture is poor in thermosetting function. On the contrary, if the quantity of the added epoxy resin exceeds 60 parts, the mixture with the quarterly vinyl acetate-ethylene copolymer is deteriorated in stability to cause problems in preparation and practical use thereof although the mixture has improved setting function. Meanwhile, even when an epoxy resin is added to a reaction mixture prior to polymerization, adverse copolymerization of the epoxy resin does not substantially take place provided that the reaction temperature at the polymerization step is maintained at about 40° to 70° C.

The particle size of the epoxy resin dispersed in the emulsion of the quarterly vinyl acetate-ethylene copolymer is preferably less than 10 microns, more preferably in the range of from 0.1 to 1 micron, the latter mentioned particle size being substantially equal to that of the emulsion particles of the quarterly vinyl acetate-ethylene copolymer. In order to form emulsion particles or droplets of epoxy resin having so small size as mentioned above, the epoxy resin may be added to a reaction mixture for the quarterly vinyl acetate-ethylene copolymer prior to polymerization step and emulsified and dispersed by the action of the emulsifier used for emulsifying the monomers. Alternatively, when an epoxy resin is added to the copolymer after the polymerization step, the epoxy resin may be emulsified through a method comprising the step of preparing an emulsifying medium by dissolving an emulsifier in water, the step of putting the emulsifying medium in a vessel provided with a stirrer, and the step of dropwisely adding the epoxy resin into the emulsifying medium under high speed stirring to obtain an emulsion of the epoxy resin; or through a method comprising the step of heating the epoxy resin at 50° to 60° C. to lower the viscosity thereof, the step of dropwisely adding the hot epoxy resin in an emulsifying medium heated similarly to 50° to 60° C. under high speed stirring, and the step of rapid cooling to obtain an emulsion of the epoxy resin. The thus obtained emulsion is mixed with the emulsion of the quarterly vinyl acetate-ethylene copolymer of the invention. The most recommendable method comprises the step of dispersing an epoxy resin at 50° to 60° C. to obtain an emulsion containing micro particles of the epoxy resin, and the step of dropwisely adding the thus obtained emulsion continuously to the emulsion of the quarterly vinyl acetate-ethylene copolymer of the invention maintained at about 20° C.

The adhesive composition of this type is obtained by mixing an epoxy resin with the emulsion of the quarterly vinyl acetate-ethylene copolymer of the invention in the form of an aqueous emulsion containing about 20 to 70% of solid contents. When this adhesive composition is coated on the surface of a piece to be glued and then maintained at 100° to 130° C. for 1 to 10 minutes, a hardened adhesive coating excellent in water-proof, heat resistant and solvent-proof properties is formed.

Finally, the aqueous emulsion adhesive containing an epoxy resin and a nitrogen-containing resin selected from polyaminepolyamides and polyethyleneimines and mixtures thereof admixed with the emulsion of the quarterly vinyl acetate-ethylene copolymer of the invention will be described. The aqueous emulsion adhesive of this thpe is particularly suited for use to manufacture a laminate.

There is an increasing demand for the laminated composite films made of different kinds of materials, such as paper, metal foils and plastics films, laminated with each other and utilized for industrial and domestic uses. For example, composite films prepared by laminating paper, metal foils and plastics films are widely used for packing food stuffs, a laminate plywood is produced by applying a plastics film on a plywood, and a plastics film is applied on a printed paper sheet for protecting and glazing purposes. The aqueous emulsion adhesive of the invention containing an epoxy resin and a nitrogen containing resin is particularly suited for use as the adhesive used for the production of such laminated materials.

The adhesive composition of the present invention is prepared by dispersing an epoxy resin and a nitrogen-containing resin in the quarterly vinyl acetate-ethylene copolymer just prior to use. The main component of the adhesive composition, namely the quarterly vinyl acetate-ethyelene copolymer, is improved in adhesive power to a hydrophobic materials, such as polyolefin resin films, by the incorporation of acid monomer (III) and acrylamide compound (IV). Accordingly, although the use of polyvinyl alcohol is not excluded, the use thereof as a protection colloid is not essential. Deterioration in trnsparency of the dried adhesive membrane due to the presence of polyvinyl alcohol can be obviated. Since carboxylic groups or other functional groups for forming cross-linking bonds are introduced and present in the quarterly vinyl acetate-ethylene copolymer (hereinafter referred to as main component polymer) contained in the emulsion mixture, these functional groups react with the added epoxy resin and nitrogen-containing resin to form a three-dimensional structure in the hardened membrane. As a result, the hardened membrane does not become white even when it is subjected to boiling for sterilization, and the adhesive power thereof is not lowered by heating. The three-dimensional structure provides stiffness required for use as a package material, and obviates troubles at the filing and heat-sealing steps to provide a smart appearance.

The main component polymer of the adhesive composition of this invention, i.e. the quarterly vinyl acetate-ethylene copolymer, has the cross-linking ability by itself, since it is prepared from a copolymerization mixture containing an acid monomer (III) and an acrylamide compound (IV), so that it is thermally set by heating at a temperature of from 120° C. to 150° C. However, plastics films made of polyolefins, polyamides and polystyrene tend to be thermally shrinked when subjected to a high temperature above 100° C. For this reason, an adhesive used for producing a laminated film from these plastics films is required to form the cross-linking structure at a temperature lower than 100° C. By the addition of a nitrogen-containing resin and an epoxy resin to the quarterly copolymer of this invention, there is provided an adhesive composition which can be cross-linked at a temperature of lower than 100° C.

The adhesive composition of this type prepared in accordance with this invention includes the quarterly vinyl acetate-ethylene copolymer (A), a nitrogen-containing resin (B) and an epoxy resin (C), all being dispersed in an aqueous medium forming an emulsion. Accordingly, even if the three components (A), (B) and (C) are present in the same liquid constituting the adhesive composition of this invention, the reactions between these components are suppressed at normal temperature. As a mixed form, the adhesive emulsion composition according to this invention has a pot-life of at least 8 hours to 3 days. However, it is preferred that the reactive quarterly vinyl acetate-ethyelene copolymer (A) and the reactive nitrogen-containing resin (B) be separately stored. A preferred embodiment of the adhesive composition of this invention is a two-liquid type combination comprising a first liquid containing the components (A) and (B) in the ratio, by weight, of (A):(B)=100:5 to 60 and a second liquid containing the components (A) and (C) in the ratio, by weight, of (A):(C)=100:5 to 100. The composition of this two-liquid combination has a pot-life of more than one year and can be stored stably over one year, since the reactivity between the components (A) and (B) and the reactivity between the components (A) and (C) are very low.

In preparation of the adhesive composition of this type, the components (B) and (C) may be separately dispersed in aqueous dispersion media and the thus obtained liquids are added to the aqueous dispersion of the main component polymer (A), i.e. the quarterly vinyl acetate-ethylene copolymer of the invention. However, as has been described hereinabove, it is preferred that the components (B) and (C) separately dispersed in aqueous media and individually admixed with the emulsions of the quarterly vinyl acetate-ethylene copolymer to form first and second liquids which are to be mixed together in use.

The polyaminepolyamides and polyethyleneimines used as the nitrogen-containing resin in the adhesive composition of this type are the same as used in the other type aqueous emulsion adhesive as the modifier. The detailed description thereof will not be given again, and it is requested to refer back to the preceding description concerning the polyamine polyamides and polyethyleneimines.

In the adhesive composition according to this invention, the nitrogen-containing resin is considered to serve as a hardener for the epoxy resin. However, the nitrogen-containing resins used in the invention are less poisonous and volatile when compared to commonly-used hardeners for epoxy resin, such as aliphatic, alicyclic and aromatic amines, and hence particularly suited for use in adhesives adapted for making laminated package materials for packing or wrapping food stuffs.

In order to prepare the first liquid of the two-liquid type adhesive, a nitrogen-containing resin is admixed with the emulsion of the quarterly vinyl acetate-ethylene copolymer of the invention in a ratio of 2.5 to 30 parts, preferably 10 to 25 parts, based on 100 parts (solid base) of the quarterly vinyl acetate-ethylene copolymer. If the admixed ratio is less than 2.5 parts, the effect of improving the adhesive property to a hydrophobic resin is limited and the thermosetting capacity at low temperature becomes unsatisfactory, whereas if the admixed ratio exceeds 30 parts, the hardened adhesive membrane becomes too soft for practical applications.

The second liquid of the two-liquid type adhesive is prepared by admixing an epoxy resin with the emulsion of the quarterly vinyl acetate-ethylene copolymer of the invention. The epoxy resins which may be used for this purpose are the same as used in the other type aqueous emulsion adhesive of this invention which has been described hereinbefore. Therefore, the detailed description of these epoxy resins will not be given again, and it is requested to refer back to the preceding description, if necessary.

The second liquid is prepared by admixing an epoxy resin with the emulsion of the quarterly vinyl acetate-ethylene copolymer of the invention in a ratio of 2.5 to 50 parts, preferably 10 to 45 parts, based on 100 parts (solid base) of the quarterly vinyl acetate-ethylene copolymer. If the admixed ratio of the epoxy-resin is less than 2.5 parts, the resultant admixture can hardly be set at a temperature of from the room temperature to less than 100° C., whereas if the admixed ratio exceeds 50 parts, the resultant admixture is poor in stability to causing problems in preparation and practical use though nevertheless the admixture has satisfactory setting property.

In preparation of either of the first and second liquids by admixing a nitrogen-containing resin (B) and an epoxy resin (C) with the emulsion of the quarterly vinyl acetate-ethylene copolymer (A), the admixing method is not limited. However, since the components (B) and (C) are generally highly viscous, it is recommended to charge the emulsion of the component (A) firstly in a mixing vessel followed by admixing the component (B) or (C) under high speed stirring to dispress and emulsify the component (B) or (C) in the emulsion of the component (A). The component (B) or (C) may be heated to lower the viscosity thereof at a temperature, for instance, of about 40° to 60° C. However, the heating temperature should be lower than 60° C. in order to exclude the risk of disruption of the emulsion. It is preferred that the component (B) or (C) has been dissolved in an organic solvent, for example to form a solution containing 1 part of the component (B) or (C) dissolved in 0.1 to 10 parts of an organic solvent, prior to the step of admixing the same with the emulsion of the component (A). The solvents suited for use for this purpose include a variety of glycols such as ethylene glycol, propylene glycol, polyethylene glycol and polypropylene glycol; glycerin; and mixed solvents of mineral spirit with ester solvents such as ethylene glycol monoethyl acetate, ethylene glycol diacetate, diethylene glycol monoacetate, ethylene glycol monomethyl ether acetate, 2-ethylhexyl acetate, hexyl acetate and isobutyl isobutylate. A wetting agent for promoting dispersion of the components (B) and (C) into the emulsion of the component (A) may also be used, and the examples of the wettting agent include commercially available nonionic wetting agents made of modified alkylphenols, such as alkylphenoxypoly(ethyleneoxy)ethanol and the nonyl phenol-ethylene oxide condensates added with 9 to 10 mols of ethylene oxide.

If the temperature at the copolymerization step of preparing the emulsion of the quarterly vinyl acetate-ethylene copolymer is about 40° to 70° C., and the first and second liquids of the two-liquid combination are separately prepared, the nitrogen-containing resin or the epoxy resin may be added to the reaction mixture prior to the polymerization step without being caused by the adverse copolymerization of the nitrogen-containing resin or the epoxy resin. The first and second liquids thus prepared are not necessarily admixed with any other modifier after the copolymerization step of preparing the emulsion of the quarterly vinyl acetate-ethylene copolymer admixed with either one of the components (B) or (C).

The first and second liquids are mixed together to obtain an adhesive composition ready for use. The mixing ratio of the first liquid to the second liquid is generally about 1:1, and may be varied arbitrarily in the range such that the final emulsion compositon include 100 parts (solid base) of the main component polymer (A), 2.5 to 30 parts of the nitrogen-containing resin (B) and 2.5 to 50 parts of the epoxy resin (C).

The adhesive composition of this invention containing a nitrogen-containing resin and an epoxy resin is obtained in the final form of an aqueous emulsion having about 20 to 70% of solid content, irrespective of whether the final product ready for use is the admixture of two liquids or the admixture of the components (A), (B) and (C). Thus prepared final emulsion may be coated on an article or film, in accordance with the normal procedure, and then dried and hardened at a temperature of from the room temperature to 100° C., or alternatively may be treated through a dry laminate process wherein the emulsion is coated on at least one side of the materials to be laminated and dried, followed by overlaying the paired laminate material on the glued side and heating under pressure.

EXAMPLES OF THE INVENTION

The present invention will now be described further in detail with reference to the examples thereof.

EXAMPLE 1

Preparation of Emulsion of Quarterly Copolymer 3 parts, respectively, of two kinds of diethylene nonylphenyl ethers having the HLB values of 18.5 and 12.0 were charged in a polymerization reactor together with 0.01 parts of sodium acetate, 100 parts of water and 0.01 parts of ammonium persulfate. Thus, 54 parts of vinyl acetate was added to the emulsion for polymerization in the reactor under stirring. After purging the vapor phase in the polymerization system with nitrogen gas, the emulsion was heated to 60° C. and ethylene was pressed into the reactor until the pressure in the reactor reached 50 kg/cm². Separately, 5 parts of maleic anhydride and 5 parts of N-iso-butoxymethyl-acrylamide were dissolved in 54 parts of vinyl acetate to prepare an after-addition monomer solution. This after-addition monomer solution was dropwisely and continuously added into the reaction vessel over the period of 4 hours using a high pressure pump, when the polymerized monomers reached 10% of the total monomers of the originally charged vinyl acetate. During the period of dropwise addition of the after-addition monomer solution, a 5% aqueous solution of ammonium persulfate was supplemented into the system. After 5 hours, it was ascertained that the residual monomers were decreased to a level of less than 0.5%, and then the system was cooled to complete the polymerization operation.

The solid content of the thus obtained emulsion was 57.3%, the average particle size was 270 mμ, the viscosity of the emulsion was 4100 cps. The viscosity was measured using a BM viscometer at 30 rpm. and at 30° C.

Meanwhile, the viscosities of the resultant emulsions obtained by the following Examples were measured using the same viscometer under the same conditions.

The emulsion of this Example was filtered through a 325 mesh stainless steel netting to find that the coarser particle ratio, i.e. the solid content left on the netting based on the total solid content of the emulsion, was 0.0048%. The adhesive properties of this emulsion will be shown in the following Table 1 together with those of the emulsions obtained by the following Examples.

EXAMPLE 2

Preparation of Emulsion of Quarterly Copolymer

An emulsifying medium composed of 2 parts of sodium lauryl sulfate, 3 parts of oxyethylene-oxypropylene block copolymer, 0.02 parts of sodium dihydrogenphosphate, 100 parts of water and 0.01 parts of ammonium persulfate was charged into a polymerization reactor, and then added with 30 parts of vinyl acetate. After purging the vapor phase in the system with nitrogen gas, the emulsion was heated to 55° C. and ethylene was pressed into the reactor until the pressure in the reactor reached 45 kg/cm². When the polymerized monomers reached 20% of the total monomers of the originally charged vinyl acetate, a separately prepared solution composed of 70 parts of vinyl acetate, 4 parts of acrylic acid and 7 parts of N-propoxymethylacrylamide was dropwisely and intermittently added from a high pressure vessel into the reactor over a period of 5 hours. During the period of dropwise addition of the latter-mentioned solution, a 5% aqueous solution of ammonium persulfate was supplemented into the system. After 6 hours, it was ascertained that the residual unreacted monomers were decreased to a level of less than 0.7%, and then the system was cooled to terminate the polymerization.

The obtained emulsion was a uniform white emulsion having a solid content of 54.3%, an average particle size of 310 mμ and a viscosity of 3,600 cps. This emulsion was filtered through a 325 mesh stainless steel netting to find that the coarser particle ratio thereof was 0.0048%.

EXAMPLE 3

Preparation of Emulsion of Quarterly Copolymer

An emulsion for polymerization composed of 2 parts of polyoxyethylene nonylphenyl ether having an HLB value of 18.5, 2 parts of polyoxyethylene nonylphenyl ether having an HLB value of 12.0, 0.01 parts of sodium acetate, 100 parts of water, 3 parts of polyvinyl alcohol (available under Trade Name of DENKA POVAL B-17) and 0.01 parts of ammonium persulfate was charged into a polymerization reactor, and then added with 60 parts of vinyl acetate under agitation. Similar to Example 1, polymerization was continued under the ethylene atmosphere. When the polymerized monomers reached 10% of the total monomers of originally charged vinyl acetate, a separately prepared after-addition monomer mixture composed of 40 parts of vinyl acetate, 3 parts of methacrylic acid, 2 parts of acrylic acid and 5 parts of N-n-butoxymethylacrylamide was dropwisely and continuously added similarly to Example 1.

The solid contnet of the thus obtained emulsion was 55.1%, the average particle size thereof was 480 mμ, and the viscosity thereof was 5,300 cps. The emulsion was filtered through a 325 mesh stainless steel netting to find that the coarser particle ratio was 0.0065%.

EXAMPLE 4

Preparation of Emulsion of Quarterly Copolymer 40 parts of vinyl acetate was added to the same emulsion composition as used in Example 1 under agitation. The other conditions were the same as in Example 1. When the polymerized monomers reached 45% of the total monomers of the originally charged vinyl acetate, an after-addition monomer solution composed of 68 parts of vinyl acetate, 5 parts of maleic acid anhydride and 5 parts of acrylamide was dropwisely and continuously added in the manner similarly to Example 1.

The solid content of the thus obtained emulsion was 57.4%, the average particle size thereof was 290 mμ, and the viscosity thereof was 3,700 cps. The emulsion was filtered through a 325 mesh stainless steel netting to find that the coarser particle ratio was 0.0048%.

TABLE 1

| | Parts by mt. Based on 100 parts by wt. of vinyl Acetate Contained in EVA Copolymer | | | Adhesive Property (I) PET/Pure White Machine Glazed Paper | | |
|---|---|---|---|---|---|---|
| | | | | Item | | |
| Ex. No. | Ethylene | Acid Monomer | Acrylamide Compound | (1) Adhesive Property under Normal Condition | (2) Adhesive Property after Dipped in Water | (3) Adhesive Property when subjected to Heating |
| 1 | 22.0 | 4.6 | 4.6 | Paper Torn | Paper Torn | ◉ |
| 2 | 24.7 | 4.0 | 4.0 | " | " | ◉ |
| 3 | 22.7 | 5.0 | 5.0 | " | " | ○ ◉ |
| 4 | 23.7 | 4.6 | 4.6 | " | " | ◉ |
| Adhesive Property | | | | | | |

TABLE 1-continued

| | (II) O—Nylon/Al Foil | | | (III) Decorative Sheet of PE/Grade I Waterproof Plywood | | | |
|---|---|---|---|---|---|---|---|
| | | | | Item | | | |
| Ex. No. | (4) Peeling Strength under Normal Condition (g/15 mm) | (5) Peeling Strength When Subjected to Boiling (g/mm) | (6) Peeling Strength under Normal Solvent (g/15 mm) | (7) Peeling Strength after Dipped in Condition (Kg/Inch) | (8) Peeling Strength Thermal Creep water (Kg/Inch) | (9) Resistance to at Low (mm/Min.) | (10) Peeling Temp. |
| 1 | 280 | 260 | 190 | 3.3 | 108 | 3.0 | ◎ |
| 2 | 260 | 310 | 190 | 3.5 | 1.4 | 4.5 | ◎ |
| 3 | 310 | 260 | 210 | 3.4 | 1.5 | 4.5 | ◎ |
| 4 | 300 | 250 | 200 | 3.3 | 1.7 | 4.3 | ◎ |

The methods of preparing the test pieces (see Table 1) and the test methods are as follows.

(I) PET/Pure White Machine Glazed Paper

Each of the emulsions of quarterly vinyl acetate-ethylene copolymers (hereinafter referred to simply as EVA emulsion) was coated on one surface of a 15μ thick polyester film (polyethylene terephthalate film; hereinafter referred to as PET film) using the bar coater No. 22 so that the solid adhesive was applied and left on the coated surface in an quantity of about 13 g/m². A sheet of pure white machine glazed paper (Basis Weight: 150 g/m²) was laid over the surface of the PET film coated with the EVA emulsion, and the thus obtained combination of the PET film and the paper sheet was passed through a press roller assembly at normal temperature for de-gassing, dried at 120° C. for 5 minutes in a hot-air drier, and then heated under pressure at 120° C. for 10 seconds in a hot press to obtain a laminate. Test pieces each having a width of 1 inch were cut off the laminate, and subjected to tests to know (1) the adhesive property under normal condition, (2) the adhesive property after dipped in water and (3) the adhesive property when subjected to heating. The tests were conducted in accordance with the following procedures.

(1) Adhesive Property under Normal Condition:

Under normal condition, each test piece was subjected to peeling at a peeling speed of 100 mm/minute and at a peeling angle of 90 degrees using the Autograph IS-500 available from the Shimazu Seisakusho Ltd. The evaluations set forth in the Table have the folloiwng meanings:

Paper Torn: Breakdown occurs internally of the paper layer.
Interface Peeling: Interfacial Peeling occurs at the interface between the PET film and the adhesive.

(2) Adhesive Property after Dipped in Water:

Each test piece was dipped in pure water at 20° C. for 3 hours, and dried at normal temperature for one hour. The following procedure is similar to that described in the preceding item (1). The evaluation set forth in the Table has the following meaning:

Peeled: Peeling occurs at the interface between the PET film and the adhesive during dipping.

(3) Adhesive Property When subjected to Heating:

Each test piece was folded in an accordion-form or bellow-shape, the folding being repeated at an interval of 1 inch, and held at that condition by a rubber band. The thus folded test piece was allowed to stand for 24 hours in an oven maintained at 100° C., and the folded portions were observed to know whether any thermal blistering or so-called tunneling were found or not. The evaluation marks set forth in the Table have the following meanings:

: No tunneling was found.
◎ : Pin-hole blistering were found, and the tunneling
○ extent was about 5%.
△: The tunneling extent was about 5 to 30%.
x: The tunneling extent was more than 30%.

(II) O-Nylon Film/Al Foil

Each of the EVA emulsions was coated on one surface of a 15μ thick two-directionally elongated Nylon film (referred to as O-Nylon film in the following description and in the Table) using a bar coater No. 12 so that the solid adhesive was applied and left on the coated surface in a quantity of about 4 g/m² followed by drying at normal temperature. An aluminum foil was laid over the surface of the O-Nylon film coated with the adhesive, and then passed through a hot press roller assembly composed of an iron roller maintained at 80° C. and a rubber roller. Test pieces each having a width of one inch were cut off from the thus obtained dry-laminate, and subjected to tests to learn (4) the peeling strength under normal condition, (5) the peeling strength when subjected to boiling and (6) the peeling strength after dipped in a solvent. The tests were conducted in accordance with the following procedures.

(4) Peeling Strength under Normal Condition:

Under normal conditions each test piece was subjected to peeling at a peeling speed of 300 mm/minute and at a peeling angle of 180 degrees using the Autograph IS-500 available from Shimazu Seisakusho Ltd., to learn the peeling strength.

(5) Peeling Strength When Subjected to Boiling:

Each test piece was dipped in boiling water (at 100° C.) for 30 minutes, and then subjected to the peeling test similar to that described in the preceding item (4) to know the peeling strength when subjected to boiling.

(6) Peeling Strength after being Dipped in Solvent:

Each test piece was dipped in a mixed solvent ot acetone/toluene=1/1 at 20° C. for 16 hours, and then subjected to the peeling test similar to that described in item (4) to learn the peeling strength after being dipped in the solvent.

(III) Decorative Sheet of PE/Grade I water proof Plywood 13 grams of an adhesive prepared by mixing 100 parts of an EVA emulsion with 10 parts of toluene was coated on an overall surface of a plywood satisfying Grade I of the JAS Standard and having the dimensions of 30 cm×30 cm and a thickness of 5.5 mm by hand using a rubber roller. A decorative sheet of polyethylene (hereinafter referred to as PE) having a thickness of 0.15 mm and available from Toyo Tafper Co., Ltd. under the Trade Name of Tafper was overlaid thereon. The plywood applied with the decorative sheet of PE was passed through a de-gassing roller assembly at two times, and then allowed to stand for 24 hours under a pressure of 0.05 kg/cm² at a cold place. After the lapse of 48 hours after release from said pressure of 0.05 kg/cm², test pieces each having a width of one inch were cut off and subjected to the following test.

(7) Peeling strength under Normal Condition:

Under normal condition, each test piece was subjected to peeling at a peeling speed of 100 mm/minute and at a peeling angle of 180 degrees to know the peeling strength.

(8) Peeling Strength after Dipped in Water:

Each test piece was dipped in pure water at 20° C. for 24 hours, and dried at normal temperature for one hour. The following procedure is similar to that described in the preceding item (7).

(9) Resistance to Thermal Creep:

Each test piece was pre-heated by placing the same horizontally in a chamber maintained at a constant temperature of 60° C., and then a stationary loading was applied on one end of the side on which the decorative sheet of PE was applied so that the loading acts in the vertical direction. This thermal creep test was continued at 60° C. for 10 minutes and the amount of thermal creep was measured. The average amount of thermal creep per one minute was calculated to use as the index showing the resistance to thermal creep.

(10) Peeling at Low Temperature:

After allowing each test piece to stand in a chamber maintained at a constant temperature of − (minus) 20° C., the decorative sheet was peeled off from the plywood at that temperature slowly by hand at the peeling angle of 45 degrees. The result was evaluated in accordance with the following standard.

⊚: The peeled length having the mirror-like face was less than 3 mm.

○ : The peeled length having the mirror-like face was 3 to 10 mm.

Δ: The peeled length having the mirror-like face was 10 to 30 mm.

×: The peeled length having the mirror-like face was more than 30 mm.

EXAMPLE 5

Preparation of Modified Aqueous Emulsion Adhesive

Into an autoclave was charged an emulsifying medium composed of 3 parts of polyvinyl alcohol (available from Denki Kagaku Kogyo K. K. under the Trade Name of DENKA POVAL B-17), 2 parts of polyoxyethylene nonylphenyl ether (HLB=18.5), 2 parts of another polyoxyethylene nonylphenyl ether (HLB=12.0), 0.01 parts of sodium acetate, 100 parts of water and 0.01 parts of ammonium persulfate, followed by the addition of 50 parts of vinyl acetate under agitation. After purging the vapor phase of the system with nitrogen gas, the system was heated to 60° C. and then ethylene was pressed into the system until the pressure in the autoclave reached 50 kg/cm². When the polymerized monomers in the system reached 10% of the total monomers of originally charged vinyl acetate, a separately prepared after-addition monomer mixture composed of 50 parts of vinyl acetate, 6.25 parts of acrylic acid and 6.25 parts of N-n-butoxymethylacrylamide was dropwisely and continuously added into the system using a high pressure pump over a period of 4 hours. After 5 hours, it was ascertained that the residual unreacted monomers were decreased to a level of less than 0.5%, and then the system was cooled to terminate the polymerization. The solid content of the obtained emulsion was 56.3%, the average particle size thereof was 450 mμ and the viscosity thereof was 3,500 cps.

The general composition of the resultant copolymer was in the ratio of vinyl acetate:ethylene:acrylic acid:N-n-butoxymethylacrylamide=80:20:5:5.

A modified adhesive was prepared by mixing 100 parts of the aforementioned emulsion with 5 parts of a polyaminepolyamide. The used polyaminepolyamide was "Tohmide #255" available from Fuji Kasei Co., Ltd. and having an amine value of 710±20 and a viscosity of 300 to 600 cps. The obtained adhesive was diluted with pure water to prepare a diluted emulsion having a solid content of about 40% and having a viscosity of less than 250 cps. The thus diluted adhesive composition was subjected to the tests as set forth hereinbelow.

The diluted adhesive composition was coated, respectively, on a two-directionally elongated polypropylene film (hereinafter referred to as OPP film) having a thickness of 25 microns and a degree of corona discharge treatment of 36 dynes/cm, on two directionally elongated Nylon film (hereinafter referred to as ON film) having a thickness of 15 microns, and on a polyester film (hereinafter referred to as PET film) having a thickness of 15 microns using a bar coater so that each film had the coated solid density of about 3/g.m.³. After drying at room temperature, each film was united with a non-elongated polypropylene film (hereinafter referred to as CPP film) having a thickness of 40 microns and a degree of corona discharge treatment of 37 dynes/cm at 60° C. under pressure. After ageing at room temperature for three days, each of the laminated films was cut off to form test pieces of 15 mm in width, and subjected to the peeling test wherein the Autograph IS-500 available from Shimazu Seisakusho Ltd. was used and peeling angle was 180 degrees. Test result revealed that the peeling strengths of them were, respectively, 420 g, 630 g and 320 g. For the comparison purpose, similar laminates were produced and presented to the same peeling test, using an emulsion of a binary vinyl acetate-ethylene copolymer (Content of Ethylene: 20%, Protective Colloid: PVA, Solid Content: 55.1%, Viscosity: 7,800 cps.) of the prior art having a concentration of 40%. The test result of this prior art adhesive composition showed that the peeling strength thereof was so weak as only about 10 to 20 g. An adhesive having such a weak peeling strength is of no value for practical use.

Using the adhesive of this Example, a decorative sheet of PE (Tafper) was applied on a plywood to produce a decorative plywood. A Tafper sheet coated with the adhesive of this Example in a quantity of 13 g/30 cm-square was overlaid on a Grade II water-proof plywood of the JAS Standard, and the thus obtained laminate was passed through a de-gassing roller assembly and then pressed at a pressure of 50 kg/30 cm-square for 24 hours. After releasing the pressure, the laminate was aged for additional 48 hours. A test piece having a width of one inch was cut off from the aged laminate and subjected to peeling test wherein the Autograph was used and the peeling angle was 180 degrees. The peeling strength was 4.8 kg/inch, and the breakdown always occurred at the wood portion rather than the adhesive layer.

Further, a soft polyvinylchloride resin sheet was laminated with a polyurethane foam of ether type having a density of 0.024, using the adhesive of this Example. In detail, the adhesive was coated on the soft polyvinyl-chloride resin sheet in a quantity of 80 g/m² (wet base), and the polyurethane foam was overlaid.

The thus obtained composite material was dried at 80° C. for 3 minutes, and then aged for 24 hours. A test piece having a width of one inch was cut off from the aged composite material and subjected to a creep test. The creep test was conducted so that a shearing load was applied on one inch-square portion of the test piece and the environmental temperature was raised gradually (Starting Temperature Rise: 0.4° C./minute, Stationary Load: 310 g). The temperature at which the foam collapsed, namely the softening point of the adhesive, was 108° C.

The composition of the adhesive of this Example is shown in Table 2, and the results of tests are shown in Table 3.

EXAMPLES 6 TO 25

Generally following to the procedure as described in Example 5, of a variety of EVA emulsions were prepared while changing the mixing ratios of the monomers as set forth in Table 2. The thus obtained EVA emulsions were mixed with the polyaminepolyamides in the mixing ratios as set forth in Table 2 to obtain adhesives embraced in this invention.

The adhesive properties of the obtained adhesives were tested in accordance with similar procedures as described in Example 5. The results are shown in Table 3.

TABLE 2

| | Composition | | | | | | | | | | |
|---|---|---|---|---|---|---|---|---|---|---|---|
| | EVA Emulsion | | | | | | | Polyamine polyamide | | | |
| | Composition Charged (Part by weight) | | | | | Property | | | | | |
| Ex. No. | VAc | Ethylene | Acid Monomer Compound | Part | Acrylamide Compound | Part | Solid Content (%) | Viscosity (cps) (BM; 30 rpm 30° C.) | Trade Name | Amine Value | Viscosity (cps) | Part by wt. |
| 5 | 80 | 20 | Acrylic Acid | 5 | N—n-butoxymethyl Acrylamide | 5 | 56.3 | 3,500 | Tohmide 255 | 710 ± 20 | 300~600 | 5 |
| 6 | 80 | 20 | Acrylic Acid | 1 | N—n-butoxymethyl Acrylamide | 5 | 55.0 | 1,210 | Tohmide 255 | 710 ± 20 | 300~600 | 5 |
| 7 | 80 | 20 | Acrylic Acid | 3 | N—n-butoxymethyl Acrylamide | 5 | 55.3 | 1,680 | Tohmide 255 | 710 ± 20 | 300~600 | 5 |
| 8 | 80 | 20 | Acrylic Acid | 7 | N—n-butoxymethyl Acrylamide | 5 | 56.3 | 4,900 | Tohmide 255 | 710 ± 20 | 300~600 | 5 |
| 9 | 80 | 20 | Acrylic Acid | 5 | N—n-butoxymethyl Acrylamide | 5 | 54.6 | 1,430 | Tohmide 255 | 710 ± 20 | 300~600 | 5 |
| 10 | 80 | 20 | Acrylic Acid | 5 | N—n-butoxymethyl Acrylamide | 10 | 56.5 | 5,980 | Tohmide 255 | 710 ± 20 | 300~600 | 5 |
| 11 | 80 | 20 | Acrylic Acid | 5 | N—n-butoxymethyl Acrylamide | 15 | 57.4 | 7,010 | Tohmide 255 | 710 ± 20 | 300~600 | 5 |
| 12 | 90 | 10 | Acrylic Acid | 5 | N—n-butoxymethyl Acrylamide | 5 | 54.4 | 1,430 | Tohmide 255 | 710 ± 20 | 300~600 | 5 |
| 13 | 70 | 30 | Acrylic Acid | 5 | N—n-butoxymethyl Acrylamide | 5 | 54.8 | 1,740 | Tohmide 255 | 710 ± 20 | 300~600 | 5 |
| 14 | 65 | 35 | Acrylic Acid | 5 | N—n-butoxymethyl Acrylamide | 5 | 54.2 | 1,110 | Tohmide 255 | 710 ± 20 | 300~600 | 5 |
| 15 | 80 | 20 | Methacrylic Acid | 5 | N—n-butoxymethyl Acrylamide | 5 | 56.1 | 1,480 | Tohmide 255 | 710 ± 20 | 300~600 | 5 |
| 16 | 80 | 20 | Maleic Acid | 5 | N—n-butoxymethyl Acrylamide | 5 | 55.7 | 1,220 | Tohmide 255 | 710 ± 20 | 300~600 | 5 |
| 17 | 80 | 20 | Methacrylic Acid Maleic Acid | 2.5 2.5 | N—n-butoxymethyl Acrylamide | 5 | 55.9 | 1,950 | Tohmide 255 | 710 ± 20 | 300~600 | 5 |
| 18 | 80 | 20 | Acrylic Acid | 5 | N—iso-butoxymethyl Acrylamide | 5 | 54.9 | 1,630 | Tohmide 255 | 710 ± 20 | 300~600 | 5 |
| 19 | 80 | 20 | Acrylic Acid | 5 | N—methoxymethyl Acrylamide | 5 | 55.3 | 1,830 | Tohmide 255 | 710 ± 20 | 300~600 | 5 |
| 20 | 80 | 20 | Acrylic Acid | 5 | N—methylolacrylamide-2-ethylhexyl Ether | 5 | 55.7 | 2,210 | Tohmide 255 | 710 ± 20 | 300~600 | 5 |
| 21 | 80 | 20 | Acrylic Acid | 5 | N—n-butoxymethyl Acrylamide | 5 | 55.0 | 1,890 | Tohmide 255 | 710 ± 20 | 300~600 | 2 |
| 22 | 80 | 20 | Acrylic Acid | 5 | N—n-butoxymethyl Acrylamide | 5 | 55.1 | 1,450 | Tohmide 255 | 710 ± 20 | 300~600 | 15 |
| 23 | 80 | 20 | Acrylic Acid | 5 | N—n-butoxymethyl Acrylamide | 5 | 54.8 | 1,280 | Versamide 140 | 350~400 | 720 | 5 |
| 24 | 80 | 20 | Acrylic Acid | 5 | N—n-butoxymethyl Acrylamide | 5 | 54.9 | 1,900 | Tohmide 245S | 460 ± 20 | 1,000~2,500 | 5 |
| 25 | 80 | 20 | — | — | — | — | 55.4 | 2,870 | Tohmide 255 | 710 ± 20 | 300~600 | 5 |

TABLE 3

Result of Test on Adhesive Property

| Ex. No. | Dry-laminate (g/15 mm) OPP/CPP | ON/CPP | PET/CPP | Tafper/Plywood Adhesive Property under Normal Condition (Kg/Inch) | Resistance to Thermal Creep (mm/MM) | Peeling at Low Temp. | Soft PVC/Urethane Foam Softening Point (°C.) |
|---|---|---|---|---|---|---|---|
| 5 | 420 | 630 | 320 | 4.8 | 2.1 | O | 108 |
| 6 | 340 | 410 | 300 | 4.2 | 2.5 | O | 94 |
| 7 | 360 | 490 | 320 | 4.6 | 2.0 | O | 100 |
| 8 | 420 | 600 | 340 | 4.9 | 2.2 | O | 111 |
| 9 | 400 | 540 | 280 | 4.2 | 2.6 | O | 103 |
| 10 | 440 | 500 | 270 | 4.8 | 3.6 | O | 92 |
| 11 | 510 | 540 | 290 | 4.8 | 5.3 | O | 90 |
| 12 | 380 | 400 | 280 | 4.0 | 1.8 | Δ | 110 |
| 13 | 540 | 580 | 340 | 4.5 | 6.8 | O | 91 |
| 14 | 580 | 590 | 360 | 4.8 | 8.0 | O | 86 |
| 15 | 300 | 410 | 240 | 3.6 | 1.8 | Δ | 119 |
| 16 | 550 | 640 | 410 | 4.7 | 3.3 | O | 108 |
| 17 | 400 | 410 | 260 | 4.0 | 3.8 | O | 104 |
| 18 | 410 | 590 | 330 | 4.6 | 2.2 | O | 107 |
| 19 | 370 | 480 | 340 | 4.1 | 2.0 | O | 110 |
| 20 | 580 | 660 | 390 | 4.7 | 6.9 | O | 92 |
| 21 | 330 | 400 | 260 | 4.4 | 4.2 | O | 11 |
| 22 | 620 | 660 | 450 | 4.5 | 5.7 | O | 110 |
| 23 | 450 | 600 | 340 | 4.6 | 2.2 | O | 106 |
| 24 | 480 | 540 | 300 | 4.4 | 2.5 | O | 109 |
| 25 | 281 | 320 | 200 | 3.6 | 8.1 | O | 92 |

EXAMPLES 26 TO 29

Following to similar procedures as in Examples 5 to 25, EVA emulsions were prepared from modified monomer compositions as set forth in Table 4. Adhesives embraced in the present invention were obtained by mixing with polyalkylenepolyamines as set forth in Table 4.

The adhesive properties of the obtained adhesives were tested in accordance with similar procedure described in Example 5. The results of test are shown in Table 5.

EXAMPLES 30 TO 33

In accordance with similar procedures as in Examples 26 to 29, EVA emulsions were prepared from further modified monomer compositions as set forth in Table 6. Adhesives embraced in this invention were obtained by mixing with polyethyleneimines as set forth in Table 6.

The adhesive properties of the obtained adhesives were tested in accordance with similar procedure described in Example 5. The results of test are shown in Table 7.

TABLE 4

| | EVA Emulsion Composition Charged (Part by wt.) | | | | | Property | | Polyalkylenepolyamine | |
|---|---|---|---|---|---|---|---|---|---|
| Ex. No. | VAc | Ethylene | Acid Monomer Compound | Part | Acrylamide Compound | Part | Solid Content (%) | Viscosity (BM, 30 rpm 30° C.) | Chemical Nomenclature | Part by wt. |
| 26 | 80 | 20 | Acrylic Acid | 5 | N—n-butoxymethyl Acrylamide | 5 | 56.4 | 1,950 | Diethylenetriamine | 5 |
| 27 | 80 | 20 | Maleic Anhydride | 4 | N—n-butoxymethyl Acrylamide | 10 | 56.7 | 2,350 | Triethylenetetramine | 8 |
| 28 | 80 | 20 | Acrylic Acid Methacrylic Acid | 2.5 2.5 | N—n-butoxymethyl Acrylamide | 5 | 55.8 | 2,010 | Triethylenetetramine | 10 |
| 29 | 80 | 20 | Acrylic Acid | 5 | N—Methylolacrylamide-2-ethylhexyl Ether | 4 | 55.2 | 1,830 | Ethylenediamine | 4 |

TABLE 5

| Ex. No. | Dry-laminate (g/15 mm) OPP/CPP | ON/CPP | PET/CPP | Tafper/Plywood Adhesive Property Under Normal Condition (Kg/Inch) | Resistance to Thermal Creep (mm/Min.) | Peeling at Low Temp. | Soft PVC/ Urethane Foam Softening Point (°C.) |
|---|---|---|---|---|---|---|---|
| 26 | 340 | 580 | 280 | 4.2 | 3.3 | O | 103 |
| 27 | 390 | 520 | 310 | 4.4 | 2.1 | O | 96 |
| 28 | 330 | 430 | 300 | 4.4 | 3.3 | O | 111 |
| 29 | 350 | 480 | 340 | 4.6 | 2.0 | O | 93 |

TABLE 6

| Ex. No. | EVA Emulsion Composition Charged (Part by wt) | | | | | Property | | Polyethyleneimine | | |
|---|---|---|---|---|---|---|---|---|---|---|
| | VAc | Ethylene | Acid Monomer Compound | Part | Acrylamide Compound | Part | Solid Content (%) | Viscosity (cps) (BM, 30 rpm, 30° C.) | Trade Name | Viscosity (cps) | Part by wt |
| 30 | 80 | 20 | Acrylic Acid | 5 | N—n-butoxymethyl Acrylamide | 5 | 56.4 | 1,950 | Polyethyleneimine P1000 (Nippon Shokubai Kagaku) | 400–900 (at 25° C.) | 4 |
| 31 | 80 | 20 | Maleic Anhydride | 4 | N—n-butoxymethyl Acrylamide | 10 | 56.7 | 2,350 | Polyethyleneimine P1000 (Nippon Shokubai Kagaku) | 400–900 (at 25° C.) | 8 |
| 32 | 80 | 20 | Acrylic Acid Methacrylic Acid | 2.5 2.5 | N—n-butoxymethyl Acrylamide | 5 | 55.8 | 2,010 | Polymin SN (BASF) | 800–1,800 (at 20° C.) | 4 |
| 33 | 80 | 20 | Acrylic Acid | 5 | N—methlolacrylamide-2-ethylhexl Ether | 4 | 55.2 | 1,830 | Polymin P (BASF) | 10,000–20,000 (at 20° C.) | 5 |

TABLE 7

| | Test Item | | | | | | |
|---|---|---|---|---|---|---|---|
| | Tafper/Plywood | | | | | | Soft PVC/ Urethane Foam Softening Point (°C.) |
| Ex. No. | Dry-laminate (g/15 mm) | | | Adhesive Property Under Normal Condition (Kg/Inch) | Resistance to Thermal Creep (mm/Min.) | Peeling at Low Temp. | |
| | OPP/CPP | ON/CPP | PET/CPP | | | | |
| 30 | 540 | 530 | 310 | 4.4 | 2.7 | O | 114 |
| 31 | 530 | 500 | 330 | 4.5 | 2.4 | O | 116 |
| 32 | 580 | 520 | 280 | 4.1 | 2.8 | O | 108 |
| 33 | 510 | 520 | 350 | 4.6 | 2.3 | O | 101 |

EXAMPLE 34

An emulsifying medium having the following compositions was charged into an autoclave:

| | |
|---|---|
| Sodium Lauryl Sulfate | 2 parts |
| Oxyethylene-Oxypropylene Block Polymer | 4 parts |
| Sodium Acetate | 0.01 parts |
| Water | 100 parts |
| Ammonium Persulfate | 0.01 parts |

50 parts of vinyl acetate was added into the autoclave under agitation. After purging the vapor phase in the autoclave with nitrogen gas, the emulsion was heated to 60° C. and ethylene was pressed into the autoclave until the pressure in the atuclave reached 50 kg/cm². When the polymerized monomers reached 10% of the total monomers of the originally charged vinyl acetate, an after-addition monomer solution prepared by dissolving 6.25 parts of maleic acid anhydride and 5 parts of N-methylol acrylamide-2-ethylhexyl ether in 50 parts of vinyl acetate was dropwisely and continuously added to the polymerization system for 5 hours using a high pressure pump. After ascertaining that the residual unreacted monomers were decreased to a level of less than 0.5%, the polymerization system was cooled to terminate the reaction. The solid content of the obtained emulsion was 55.4%, the average particle size was 280 mμ, and the viscosity at 30° C. was 2,200 cps. The general composition of the resultant quarterly copolymer was composed of 77.8% of vinyl acetate, 13.2% of ethylene, 4.9% of maleic acid anhydride and 3.9% of N-methylol acrylamide-2-ethylhexyl ether. The emulsion of the quarterly copolymer was pre-heated to 60° C. and then mixed with Epikote 828 (produced by Shell Chemical Co. and having an epoxide equivalent of 175 to 200) which had been also preheated to 60° C., and also mixed with a warm aqueous solution containing 0.45 parts of an oxyethylene-oxypropylene block copolymer. The mixing ratio of the quarterly copolymer (solid base):Epikote (solid Base):solution (liquid base) = 100:20:15, and mixing was effected using a high speed stirrer to obtain a uniformly dispersed admixture. This admixture was added with aqueous ammonia to increase the viscosity to 25,000 cps. to form an adhesive composition embraced in this invention.

This adhesive composition was coated, respectively, on a tricot half cloth, a thick twill cloth 9 A of rayon and a foamed polyvinylchloride sheet to prepare substrates for flock transfer process, each having an adhesive layer of 230 g/m². Nylon piles made of short fibers each having a thickness of 1.5 deniers and a length of 0.5 mm were preliminarily treated with an anionic surface active agent of sodium silicate series to be electrodeposited with the surface active agent. The Nylon piles were electrostatically flock transferred onto each of the substrates as mentioned above, and dried at 60° C. followed by heat-treatment at 120° C. for 15 minutes. Using a rubbing tester manufactured in accordance with the method of the Japan Society for Promotion of Scientific Research, the solvent-proof and water-proof properties of those flocked or piled sheets or cloths were measured. For the comparison purpose, similar flocked or piled sheets were produced using the same substrate materials and using an adhesive composition prepared by mixing 100 parts of a commercially available emulsion of an acrylic ester, 5 parts of trimethylolmelamine and 0.5 parts of a setting promotor made of an amine, and increasing the viscosity of the mixture by the addition of aqueous ammonia to 25,000 cps. The test results are shown in Table 8.

TABLE 8

Results of Tests on Water-proof and Solvent-proof Properties
Nylon Pile (1.5 deniers, 0.5 mm in length) (Unit: Times Withstanding Rubbing)

| Substrate Pile | Tricot Half | | Rayon Thick Twill #9A | | Foamed Polyvinylchloride | |
|---|---|---|---|---|---|---|
| | Nylon Pile (1.5 deniers, 0.5 mm in length) | | | | | |
| | Water-proof* Property | Solvent-proof** Property | Water-proof Property | Solvent-proof Property | Water-proof Property | Solvent-proof Property |
| Composition of This Example | >3,000 | >500 | >3,000 | >500 | >3,000 | >500 |
| Commercially Available Composition of Acrylic Ester | <500 | <100 | <500 | <100 | <500 | <100 |

The rubbing tests were conducted in accordance with the following methods.

*Water-proof Property:

A test specimen of 30 mm×220 mm was dipped in water at 20° C. for 15 minutes, and then attached on the arcuate face of the rubbing tester manufactured in accordance with the method of the Japan Society of Promotion of Scientific Research. On the other hand, an abrasion paper specified by the JIS R-6253 was attached as the rubbing element. The test specimen was rubbed by the rubbing element repeatedly at a speed of 30 times reciprocation per a minute under a loading of 500 grams. The abrasion paper was replaced after every 500 rubbing cycles. 2 ml of water was supplemented to the test specimen and the cloth. The times of rubbing until a portion of the adhesive layer was exposed, were recorded.

**Solvent-proof Property:

The general procedure of the test is similar to that of the test for determining the water-proof property. Before attaching on the tester, the test specimen was dipped in perchloroethylene (JIS K-1521) for 15 minutes. The test was conducted using the test specimen wetted with perchloroethylene. In order to maintain the specimen wetted by perchloroethylene, 2 ml of the same was supplemented after every 100 times rubbing. The times of rubbing until a portion of the adhesive layer was exposed, were recorded.

EXAMPLE 35

Into an autoclave, 3 parts of polyvinyl alcohol (DENKA POVAL B-17), 2 parts of polyoxyethylene nonylphenyl ether (HLB=18.5), 2 parts of another polyoxyethylene nonylphenyl ether (HLB=12.0), 15 parts of an epoxy resin (Epikote 828 available from Shell Chemical Co.), 0.01 parts of sodium acetate and 100 parts of water were charged. 40 parts of vinyl acetate was added into the autoclave under agitation. After purging the vapor phase in the autoclave with nitrogen gas, the emulsion was heated to 60° C. and then ethylene was pressed into the autoclave until the pressure in the autoclave reached 50 kg/cm². Polymerization was initiated by the dropwise addition of a 2% aqueous solution of ammonium persulfate. When the polymerized monomers in the system reached 15% of the total monomers of the originally charged vinyl acetate, a mixture composed of 60 parts of vinyl acetate, 3 parts of acrylic acid, 3 parts of methacrylic acid and 6 parts of N-n-butoxymethylacrylamide was dropwisely and continuously added into the polymerization system using a high pressure pump. After ascertaining that the residual unreacted monomers were decreased to a level of less than 5%, the polymerization system was cooled to terminate the reaction. The solid content of the resultant emulsion was 53.4%, and the general composition of the quarterly copolymer was composed of 77.5% of vinyl acetate, 13.2% of ethylene, 2.3% of acrylic acid, 2.3% of methacrylic acid and 4.6% of N-n-butoxymethylacrylamide.

Using this emulsion containing the quarterly copolymer of the invention and an epoxy resin, arcuate ABS and iron plates were implanted with flock piles. Each of the substrates, namely the ABS and iron plates, was coated with the emulsion adhesive of this Example so that it carried 120 g/m² of the adhesive which was dried at 60° C. Nylon piles (1.5 deniers, 0.5 mm in length) were then implanted onto each substrate followed by heat-treatment at 110° C. for 15 minutes. Similarly as in Example 34, the water-proof property of each of the piled plates was tested using the rubbing tester manufactured in accordance with the method of the Japan Society for Promotion of Scientific Research. For the comparison purpose, similar piled plates were produced using a commercially available acrylic ester emulsion composition (the same as used in Example 34), and subjected to similar tests. The test results are shown in Table 9.

TABLE 9

Results of Tests on Water-proof Property
(Unit: Times Withstanding Rubbing)

| Substrate Pile | ABS Plate | Iron Plate |
|---|---|---|
| | Nylon Pile (1.5 deniers, 0.5 mm in length) | |
| Test Item | Water-proof Property | |
| Emulsion of This Example | >2,000 | >2,000 |
| Commercially Available Composition of Acrylic Ester | <500 | <500 |

EXAMPLE 36

Into an autoclave, an emulsifying medium composed of 3 parts of an oxyethylene-oxypropylene blcok copolymer, 3 parts of polyoxyethylene nonylphenyl ether (HLB=18.5), 0.01 parts of sodium acetate, 100 parts of water and 0.01 parts of ammonium persulfate was charged. 40 parts of vinyl acetate was added into the autoclave under agitation. After purging the vapor phase in the autoclave with nitrogen gas, the emulsion was heated to 60° C. and then ethylene was pressed into the autoclave until the pressure in the autoclave reached 50 kg/cm². When the polymerized monomers in the polymerization system reached 10% of the total monomers of the originally charged vinyl acetate, an after-addition monomer mixture containing 60 parts of vinyl acetate, 3.5 parts of acrylic acid, 3.0 parts of maleic acid anhydride and 6.5 parts of N-iso-butoxymethylacrylamide was dropwisely and continuously added into the autoclave over a period of 5 hours using a high pressure pump. After 6 hours, it was ascertained that the residual unreacted monomers were decreased to a level of less than 0.5%, the polymerization system was cooled to terminate the reaction. The resultant emulsion had a solid content of 56.7%, an average particle size of 230 mμ and a viscosity of 2,200 cps, and the general composition of the quarterly copolymer contained in the emulsion was such that vinyl acetate:ethylene:(acrylic acid+maleic acid anhydride):N-isobutoxymethylacrylamide=80:20:5.2:5.2.

Preparation of First Liquid:

100 parts of the aforementioned emulsion was added with 10 parts (17.64 parts by solid base) of Epomik Q-656, polyamide available from Mitsui Petrochemical Industries, Ltd. and having an amine value of 105 and a viscosity of 150 to 500 cps., using a high speed agitator, and then diluted with pure water to have a solid content of 40%. This first liquid had been allowed to stand at 30° C. for 3 months, and observed to check any change. However, no substantial change was found.

Preparation of Second Liquid:

0.8 parts of a polyoxyethylene nonylphenyl ether (HLB=12.0) was dissolved in 25 parts of pure water to obtain a solution to which dispersed, using a high speed agitator, was 30 parts of Epikote #828, an epoxide compound available from Shell Chemical Co. and having an epoxide equivalent of 184 to 194 and a viscosity at 25° C. of 120 to 150 poises. Then, 100 parts of the emulsion prepared in this Example was added and further agitated to be dispersed more uniformly. The thus obtained emulsion was diluted with pure water to adjust the solid content to 40%. The viscosity of the thus diluted emulsion was 35 cps. This second liquid was allowed to stand at 30° C. for 3 months, and observed to check any change. However, no substantial change was found, and no substantial precipitation was observed.

The first and second liquids prepared as described above were mixed together at a mixing ratio of 1:1 to be used as an adhesive for making the laminates of OPP/CPP, PET/PE, O-Nylon/PE, KOP/CPP and OPS/CPP through a dry-laminate process. The adhesive properties under normal condition and the adhesive properties after being subjected to boiling of these laminates were tested. As shown in the following Table 10, all of these laminates have been revealed to have good adhesive properties.

In the proceding description, the abridged representations, such as OPP, CPP, etc., mean the films of the following re. ins. These abridged representations will be used in Table 10 and also in the following description.

| | |
|---|---|
| OPP: | Two-Directionally Elongated Polypropylene |
| O—Nylon: | Two-Directionally Elongated Nylon |
| OPS: | Two-Directionally Elongated Polystyrene |
| PE: | Polyethylene |
| PET: | Polyethyleneterephtalate |
| KOP: | Two-Directionally Elongated Polypropylene Coated with Polyvinylidene chloride resion |
| CPP: | Non-Elongated Polypropylene |

TABLE 10

| Composition of Laminate | | Immediately after Adhesion | Stored at Room Temp. (25° C., 70%) | | | | Stored at High Temp. (40° C., 70%) | | | |
|---|---|---|---|---|---|---|---|---|---|---|
| | | | One Day | | 7 Days | | One Day | | 7 Days | |
| First Film (Coated with Adhesive) | Second Film | Normal Condition | Normal Condition | After Boiling | Normal Condition | After Boiling | Normal Condition | After Boiling | Normal Condition | After Boiling |
| OPP | CPP | 250 | 340 | 260 | 450 | 380 | 480 | 320 | 640 | 430 |
| PET | PE | 240 | 290 | 310 | 440 | 410 | 400 | 380 | 510 | 430 |
| O—Nylon | PE | 220 | 240 | 200 | 450 | 370 | 380 | 230 | 460 | 330 |
| KOP | CPP | 220 | 250 | 200 | 130 K-face Peeling | 240 | 160 K-face Peeling | 210 | 130 K-face Peeling | 230 |
| OPS | CPP | 330 | 420 | — | 500 | — | 400 | — | 680 | — |

Coated Quantity: 2.5–3.5 g - Solid/m² Unit: g/15 mm

Note:
"K-face Peeling" means that polyvinylidene chloride is peeled from the substrate (OPP).

Now, the method of making a laminate and the method of evaluating the adhesive property of a laminate will be described in detail.

The final adhesive composition obtained by mixing the first and second liquids, as described hereinbefore, was coated on one surface of a first film using a bar coater, and dried at about 80° C. for 15 seconds using a hot-air drier. Then, a second film was overlaid on the surface of the first film coated with the adhesive and passed through a niproll maintained at 80° C. under a pressure of 200 kg/30 cm, whereby a desired laminate of arbitrary combination was manufactured.

Immediately after the laminating step, a test piece having a width of 15 mm was cut off from the resultant laminate and subjected at once to a test for determining the adhesive strength just after the laminating step. The remaining portion of the laminate was divided into two segments, one being stored in an air-conditioned chamber maintained at 25° C., and at 70% RH, and the other being stored in an ageing chamber maintained at 40° C., and at 70% RH. After the lapse of one day and 7 days, test pieces were cut off from both of the segments stored at 25° C. and 40° C. and subjected to tests for determining the adhesive strengths under normal condition and after boiling. The adhesive strength was determined by measuring the peeling strength using the Autograph IS-500, at a crosshead speed of 300 mm/min. and at a peeling angle of 180 degrees. The adhesive strength after boiling was determined by dipping a laminated films having a width of 15 mm in boiling water (at 100° C.) for 30 minutes, followed by subjecting to the same peeling test.

EXAMPLE 37

Using the emulsion of the quarterly copolymer copolymerized in Example 36, first and second liquids were prepared as follows.

Preparation of First Liquid:

100 parts of the aforementioned emulsion obtained in Example 36 was added with 20 parts (35.27 parts by solid base) of Tohmide #245, polyamide available from Fuji Kasei Co., Ltd. and having an amine value of 400±20 and a viscosity of 1,500 to 3,000 poises, and also added with 3 parts of ethylene glycol diacetate. Using a high speed agitator, the additives were dispersed into and intimately mixed with the emulsion. Separately, water added with 0.3 parts of a polyoxyethylene nonylphenyl ether was prepared for use as a diluent. The emulsion was further added with said diluent to have a solid content of 35%. This first liquid had been allowed to stand at 30° C. for 3 months, and observed to check any change. However, neither substantial change in stored condition nor substantial precipitation was observed.

Preparation of Second Liquid:

Into 100 parts of the emulsion obtained in Example 36, dispersed by using a high speed agitator, were charged 20 parts (35.27 parts by solid base) of Epikote #815, an epoxy resin available from Shell Chemical Co. and having an epoxide equivalent of 175 to 210, 20 parts of pure water containing 0.2 parts of an oxyethylene-oxypropylene block polymer and 2 parts of Polyethylene Glycol #300 available from Dai-ichi Kogyo Seiyaku Co., Ltd. and having a molecular weight of 285 to 315. Then the emulsion was diluted with pure water to adjust the solid content thereof to 40%. This second liquid had been allowed to stand at 30° C. for 3 months, but no change in stored condition was found and no substantial precipitation was observed.

The first and second liquids were mixed together at a mixing ratio of 1:1 to be used as an adhesive for manufacturing a print laminate from the combination of OPP and print art paper. The adhesive property under normal condition, the adhesive property at high temperature and the transparency of the thus manufactured laminate are shown in Table 11. For the comparison purpose, similar laminates were manufactured using a commonly-used binary vinyl acetate-ethylene copolymer (Content of Ethylene: 18.5%). In Comparative Example 1, said binary copolymer is used singly in place of the two-liquid type adhesive composition of this Example; whereas in Comparative Example 2, said binary copolymer is used to form first and second liquids in place of the quarterly copolymer of the invention. More specifically, the finished adhesive composition of Comparative Example 2 contains all components, other than the quarterly copolymer of the invention, including the polyamide and the epoxy resin.

TABLE 11

| Adhesive | Adhesive | Test Item | | |
|---|---|---|---|---|
| | | Adhesive Property under Normal Condition | Adhesive Property at High Temp. | Transparency |
| Ex. 37 | Composition of This Example | Paper Torn | ◉ | ◉ |
| Comp. Ex. 1 | Emulsion of Binary Vinyl Acetate/Ethylene Copolymer | Interface Peeling | x | x |
| Comp. Ex. 2 | Two-Liquid Type Composition Pepared by Using the Binary Copolymer of Comp. Ex. 1 | Paper Torn | Δ | x |

TABLE 11-continued

| Adhesive | Adhesive | Test Item | | |
|---|---|---|---|---|
| | | Adhesive Property under Normal Condition | Adhesive Property at High Temp. | Transparency |

In detail, each of the lamintes subjected to the tests was manufactured by a process including the step of coating each adhesive composition on the OPP using a bar coater, the step of drying the adhesive coating at about 80° C. for 15 seconds using a hot-air drier, and the step of laminating the OPP with the print art paper by passing them through a niproll maintained at 80° C. under a pressure of 200 Kg/30 cm.

Tests were conducted in accordance with the following procedures.

Each of the laminates was aged under normal condition (at 25° C., 70% RH), and then a test piece having a width of one inch was cut off from the aged laminate. The adhesive property was determined by subjecting the test piece to peeling at a peeling rate of 100 mm/min. and at the peeling angle of 90 degrees. If the laminate was broken down internally of the paper layer, as referred to "Paper Torn" in the Table, rather than peeled at the interface of the paper layer and the OPP layer, the adhesive property or binding force was evaluated as good.

The adhesive property at a high temperature will now be described. Each test piece having a width of one inch was aged at normal temperature for 3 days, and then folded in an accordion-form or bellows-shape repeatedly at intervals of one inch and held at that condition by a rubber band. The thus folded test piece was allowed to stand for 24 hours in an oven maintained at 100° C. The folded portions were observed to know whether any thermal blisterring or so-called tunneling were found or not. The evaluation marks set forth in the Table have the following meanings:

◉: No tunneling was found.
○ : Pin-hole blisterrings were observed, and the tunneling extent was about 5% or less.
Δ: The tunneling extent was about 5 to 30%.
x: The tunneling extent was more than 30%.

The transparency of the laminate is one of the important features, particularly when used as a print laminate product. The laminate which is poor in transparency is of no commercial value when used as a printed laminate for decorative purpose. The transparency was evaluated by visual observation.

◉: Excellent in transparency
○ : Good or tolerable in transparency
Δ: Hardly to be acceptable for commercial use
x: Poor or inferior

EXAMPLE 38

An emulsion of the quarterly copolymer was prepared from the following composition generally in accordance with the procedure set forth in Example 36.

Composition of Emulsifying Medium:

| | |
|---|---|
| Oxyethylene-Oxypropylene Block Polymer | 3 parts |
| Polyoxyethylene Nonylphenyl Ether (HLB = 18.5) | 1.5 parts |
| Polyoxyethylene Nonylphenyl Ether | 1.5 parts |

-continued

| (HLD = 12.0) | |
|---|---|
| Sodium Acetate | 0.01 parts |
| Ammonium Persulfate | 0.01 parts |
| Water | 100 parts |

Quantity of Vinyl Acetate Added from the Initial Polymerization Step:
50 parts
Composition of After-Addition Monomer Mixture:

| Vinyl Acetate | 50 parts |
|---|---|
| Acrylic Acid | 4 parts |
| N—n-Butoxymethylacrylamide | 6 parts |

As the result of copolymerization, there was prepared an emulsion of a quarterly copolymer having a solid content of 56.5%, an average particle size of 210 mμ and a viscosity of 1,600 cps. This emulsion gave a laminate which was superior in transparency and had a general composition of vinyl acetate:ethylene:acrylic acid:N-n-butoxymethylacrylamide=80:20:3.2:4.8.

Similarly to Example 36, a variety of combinations of the first and second liquids, as set forth in Table 12, were produced using the aforementioned emulsion as the principal component while being added with various polyamides, polyethyleneimines and epoxide compounds. The mixing ratio of the first liquids to the second liquids were 1:1 in all cases. Using the thus produced adhesive compositions, laminates of OPP/CPP were manufactured and the adhesive strengths at the interface of the component layers were measured. The test results showed that all of the combinations had excellent adhesive properties. For the comparison purpose, conventional solvent-type adhesives including a polyurethane resin widely used in the art and adhesives out of the scope of the present invention were tested.

The finished adhesive compositions were prepared by mixing the equal volumes of the first and second liquids, and then diluted the mixture to adjust the viscosity to 20 to 25 seconds when measured by the use of Zahn cup No. 3. The method of manufacturing the laminates, the method of determining the adhesive strengths and the conditions for ageing were the same as those described in Example 36.

The followings are brief descriptions on the Trade Names appearing in Table 12, and given for clarifying the materials used in the Examples and the Comparative Examples.

| Materials Used | Manufacturers | Amine Value or Epoxide Value |
|---|---|---|
| Tohmide #245 | Fuji Kasei Co., Ltd. | 400 ± 20 |
| Tohmide #255 | Fuji Kasei Co., Ltd. | 710 ± 20 |
| Versamide #140 | General Mills Chemicals, Inc. | 350~400 |
| Epomik Q-656 | Mitui Petrochemical Industries, Ltd. | 105 |
| Araldite HY-965 | Ciba-Geigiy A.G. | 80 |
| Epoky H258 | Mitsui Toatsu Chemicals, Inc. | 160~180 |
| Epoky H350 | Mitsui Toatsu Chemicals, Inc. | 230~270 |
| Polyethyleneimine P-1000 | Nippon Shokubai Kagaku Kogyo Co., Ltd. | |
| Epikote #815 | Shell Chemical Co. | 183~193 |
| Epikote #828 | Shell Chemical Co. | 184~194 |
| Araldite Cy-135 | Ciba-Geigiy A.G. | 200 |
| Epomik R-120 | Mitsui Petrochemical Industries, Ltd. | 185~200 |

TABLE 12

| | | Composition of Adhesion | | | | | | | |
|---|---|---|---|---|---|---|---|---|---|
| | | First Liquid | | | | Second Liquid | | | |
| Ex. No. | Emulsion 100 parts | Polyamide and/or Polyethy-lene-imine | Part (Emulsion Base) | Part (Solid Base) | Emulsion 100 parts | Epoxy Compound | Part (Emulsion Base) | Part (Solid Base) | Mixed Ratio |
| 39 | Emulsion of Ex. 34 | Tohmide #255 | 15 | 26.55 | Emulsion of Ex. 34 | Epikote #828 | 35 | 61.75 | 1/1 |
| 40 | | Versamide #140 | 20 | 35.40 | | Epikote #828 | 40 | 70.80 | |
| 41 | | Epomik Q-656 | 5 | 8.85 | | Araldite CY-235 | 25 | 44.25 | |
| 42 | | Araldite HY-965 | 25 | 44.25 | | Araldite CY-235 | 45 | 79.65 | |
| 43 | | Epoky H258 | 33 | 58.41 | | Epikote #828 | 50 | 88.5 | |
| 44 | | Tohmide #245 | 20 | 35.40 | | Epomik R-120 | 30 | 53.10 | |
| 45 | | Polyethy-lene-imine P1000 | 15 | 26.55 | | Epikote #828 | 40 | 70.80 | |
| 46 | | Epoky H 350 | 10 | 17.70 | | Epikote #815 | 35 | 61.95 | |
| Com. Ex. 3 | | Versamide #140 | 20 | 35.40 | — | — | — | | |
| 4 | Conventional Binary EVA Emulsion (Ethylene content 18%) | Tohmide #255 | 15 | 26.55 | Conventional Binary EVA Emulsion (Ethylene content 18%) | Epikote #828 | 35 | 61.95 | |
| 5 | | — | — | — | | — | — | — | |
| 6 | | Hardener for Polyurethane (Solvent Type) | | | | Main Compont for Polyurethane (Solvent Type) | | | |

TABLE 12-continued

Coated Quantity: 2.5~3.5 g/m²

Adhesive Property of Laminated Film (g/15 mm)

| Laminated Material | Initial Adhesive Strength | Stored at Room Temp. (25° C., 70% RH) | | | | Stored at High Temp. (40° C., 70% RH) | | | |
|---|---|---|---|---|---|---|---|---|---|
| | | One Day | | 7 Days | | One Day | | 7 Days | |
| | | Under Normal Condition | After Boiling | Under Normal Condition | After Boiling | Under Normal Condition | After Boiling | Under Normal Condition | After Boiling |
| OPP/CPP | 320 | 350 | 300 | 480 | 360 | 450 | 380 | 620 | 510 |
| | 270 | 340 | 280 | 450 | 340 | 450 | 350 | 580 | 480 |
| | 200 | 270 | 190 | 340 | 260 | 340 | 280 | 410 | 320 |
| | 330 | 380 | 300 | 470 | 380 | 450 | 360 | 590 | 480 |
| | 260 | 320 | 210 | 380 | 240 | 390 | 270 | 420 | 380 |
| | 300 | 330 | 240 | 410 | 290 | 380 | 280 | 500 | 400 |
| | 320 | 360 | 310 | 460 | 340 | 440 | 350 | 660 | 360 |
| | 240 | 280 | 210 | 390 | 320 | 420 | 340 | 550 | 360 |
| | 260 | 340 | 40 | 420 | 85 | 400 | 65 | 380 | 70 |
| | 110 | 180 | 70 | 210 | 40 | 160 | 50 | 180 | 35 |
| | 10 | 0 | Peeled | 5 | Peeled | 0 | Peeled | 0 | Peeled |
| | 180 | 260 | 220 | 350 | 290 | 380 | 340 | 360 | 300 |

Although the present invention has been described by referring to specific examples thereof, it should be apparent to those skilled in the art that many modifications and changes may be made without departing from the spirit and scope thereof. The present examples are therefore to be considered in all respects as illustrative and not restrictive. The scope of the invention is limited only by the appended claims, and all changes which come within the meaning and range of equivalency of the claims are to be included therein.

What is claimed is:

1. An emulsion of a quarterly vinyl acetate-ethylene copolymer emulsified in an aqueous medium, said quarterly copolymer consisting of 100 parts, by weight, of a vinyl acetate-ethylene copolymer prepared from 95 to 60 parts, by weight, of vinyl acetate monomer (I) and 5 to 40 parts, by weight, of ethylene monomer (II);

0.5 to 7 parts, by weight, of an acid monomer (III) selected from the group consisting of monobasic unsaturated carboxylic acids each having 3 to 17 carbon atoms, dibasic unsaturated carboxylic acids each having 3 to 17 carbon atoms, anhydrides of said dibasic unsaturated carboxylic acids and semiesters of said dibasic unsaturated carboxylic acids each having an alkyl chain of the alcohol part having 1 to 10 carbon atoms, and mixtures thereof; and 0.5 to 15 parts, by weight, of a substantially water-insoluble acrylamide compound (IV) represented by the general formula of $CH_2=CHCONHCH_2OR$; wherein R is an alkyl group having 4 to 10 carbon atoms.

2. An emulsion according to claim 1, wherein said quarterly copolymer is prepared by firstly polymerizing 20 to 80%, by weight, of said vinyl acetate monomer (I) in an aqueous medium and under the atmosphere of said ethylene monomer (II) forming the vapor phase until the degree of polymerized monomers reaches 5 to 50% of the total monomers, and then adding a mixture containing the remaining portion of said vinyl acetate monomer (I), said acid monomer (III) and said acrylamide compound (IV) to continue the polymerization reaction.

3. An emulsion according to claim 1, wherein said monobasic and dibasic unsaturated carboxylic acids are selected from the group consisting of acrylic acid, methacrylic acid, itaconic acid, maleic acid, fumaric acid, citraconic acid, aconitic acid, crotonic acid and mixtures thereof.

4. An emulsion according to claim 1, wherein said acrylamide compound (IV) is selected from the group consisting of N-n-butoxymethylacrylamide, N-iso-butoxymethylacrylamide, N-methylolacrylamide-2-ethylhexyl ether and mixtures thereof.

5. An aqueous emulsion adhesive comprising said emulsion of said quarterly vinyl acetate-ethylene copolymer as set forth in claim 1 containing 100 parts, by weight, based on solid contents and 0.5 to 20 parts, by weight, of a modifier selected from the group consisting of polyalkylenepolyamines, polyethyleneimines, polyaminepolyamides and mixtures thereof.

6. An aqueous emulsion adhesive according to claim 5, wherein said modifier is mixed with said emulsion of said quarterly vinyl acetate-ethylene copolymer in the form of a solution in an organic solvent, the solution being composed of 1 part, by weight, of said modifier and 0.1 to 10 parts, by weight, of said organic solvent.

7. An emulsion according to claim 1, further comprising a plasticizer and a promotor for forming a skin membrane.

* * * * *